（12） United States Patent
Nam et al.

(10) Patent No.: US 9,582,031 B2
(45) Date of Patent: Feb. 28, 2017

(54) MOBILE DEVICE

(75) Inventors: Yong Nam, Seoul (KR); Kyuno Cha, Seoul (KR); Jongseok Park, Gyeonggi-Do (KR); Myungsup Ahn, Seoul (KR); ByeongYun Lee, Gyeonggi-Do (KR); Youngbyn Lee, Gyeonggi-Do (KR); Seungseong Hong, Gyeonggi-Do (KR); Ansun Hyun, Seoul (KR); Seongho Lee, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

(21) Appl. No.: 13/110,458

(22) Filed: May 18, 2011

(65) Prior Publication Data

US 2011/0286166 A1    Nov. 24, 2011

(30) Foreign Application Priority Data

May 19, 2010    (KR) .................. 10-2010-0047128

(51) Int. Cl.
*H05K 7/00* (2006.01)
*H05K 5/00* (2006.01)
*G06F 1/16* (2006.01)

(52) U.S. Cl.
CPC ............. *G06F 1/1601* (2013.01); *G06F 1/162* (2013.01); *G06F 1/1616* (2013.01); *G06F 1/1637* (2013.01); *G06F 1/1686* (2013.01); *G06F 1/1698* (2013.01)

(58) Field of Classification Search
CPC ....... G06F 1/16; G06F 1/33225; H05K 5/0026; H05K 5/026; H05K 2201/10159

USPC ............... 361/679.01, 679.02, 679.08, 679.09, 361/679.3, 679.55–679.59; 345/156, 157, 168, 345/169
See application file for complete search history.

(56) References Cited

U.S. PATENT DOCUMENTS

| 2002/0151328 | A1 | 10/2002 | Shin et al. |
| 2003/0040338 | A1* | 2/2003 | Saito .............................. 455/562 |
| 2003/0124985 | A1* | 7/2003 | Shin et al. ...................... 455/82 |
| 2003/0203747 | A1 | 10/2003 | Nagamine |
| 2004/0053649 | A1* | 3/2004 | Sun .............................. 455/575.1 |
| 2005/0286214 | A1* | 12/2005 | Chen ............................. 361/681 |
| 2008/0085736 | A1* | 4/2008 | Kitamura et al. ............. 455/557 |
| 2009/0086420 | A1 | 4/2009 | Stockham et al. |
| 2009/0278764 | A1* | 11/2009 | Kuwahara et al. ............ 345/1.3 |

(Continued)

FOREIGN PATENT DOCUMENTS

| CN | 1638403 A | 7/2005 |
| CN | 1224133 C | 10/2005 |

(Continued)

OTHER PUBLICATIONS

Notice of Allowance issued Nov. 9, 2011 in a corresponding Korean patent application.

(Continued)

*Primary Examiner* — Jerry Wu
(74) *Attorney, Agent, or Firm* — Lee Hong Degerman Kang & Waimey (57)    ABSTRACT

A mobile device, including a main body provided with an input device, and a cover portion including a display unit, the cover portion including a first bezel portion and a second bezel portion, the second bezel portion having a hinge portion to couple the cover portion to the main body, wherein the first bezel portion includes a fastening portion of the display unit and the second bezel portion includes at least one of a camera and a wireless antenna.

7 Claims, 12 Drawing Sheets

(56) References Cited

U.S. PATENT DOCUMENTS

2010/0067186 A1* 3/2010 Aya et al. ................ 361/679.28
2011/0115735 A1   5/2011 Lev et al.

FOREIGN PATENT DOCUMENTS

| CN | 1263273 C | 7/2006 |
| EP | 1 357 726 A1 | 10/2003 |
| KR | 10-2008-000481 A | 1/2008 |
| TW | 534574 | 5/2003 |
| TW | 200517813 | 6/2005 |
| WO | 2010/005423 A1 | 1/2010 |

OTHER PUBLICATIONS

Notification of First Office Action dated Aug. 1, 2013 from the State Intellectual Property Office of the People's Republic of China in counterpart Chinese application No. 201110135183.4.
First Office Action dated Jul. 17, 2013 from the Taiwan Patent Office in counterpart Taiwan application No. 100116667.
Office Action dated Apr. 21, 2014, issued by the State Intellectual Property Office of China in Chinese Patent Application No. 201110135183.4.
Office Action dated Oct. 20, 2014, issued by the State Intellectual Property Office of China in Chinese Patent Application No. 201110135183.4.
Search Report dated Mar. 3, 2015, issued by the European Patent Office in European Patent Application No. 11003830.4.

* cited by examiner

MOBILE DEVICE

This application claims the benefit of the Korean Patent Application No. 10-2010-0047128 filed on May 19, 2010, which is hereby incorporated by reference.

BACKGROUND OF THE INVENTION

Field of the Invention

The present invention relates to a mobile device, and more particularly to the structure of a bezel in a display unit mounted on a mobile device and the implementation method thereof.

Discussion of the Related Art

A mobile device including a mobile computer, laptop PC, palmtop PC, PDA, or the like, a mobile communication device, a gaming device, an audio or video player (e.g., MP3 player, portable media player (PMP)) or the like has a display device for outputting visual information or various user interfaces. A camera or antenna may be mounted on a mobile device to provide the production, transmission and reception, or various wireless services of a multimedia. It may be provided in a display device rather than a main body, thereby enhancing the utility and performance. However, when a camera or antenna is provided in the display device, it may cause to increase the width of a bezel portion that limits a portion of visual information being outputted by the display unit, thereby deteriorating the appearance of a mobile device.

SUMMARY OF THE INVENTION

Accordingly, the present invention is directed to a mobile device that substantially obviates one or more problems due to limitations and disadvantages of the related art.

An object of the present invention is to provide a bezel in a display unit mounted on a mobile device and the implementation method thereof.

Another object of the present invention is to minimize the width of a bezel portion that limits a display area of the display device mounted on a mobile device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the mobile device includes a main body provided with an input device, and a cover portion including a display unit, the cover portion including a first bezel portion and a second bezel portion, the second bezel portion having a hinge portion to couple the cover portion to the main body, wherein the first bezel portion includes a fastening portion of the display unit and the second bezel portion includes at least one of a camera and a wireless antenna.

In another aspect, the mobile device includes a cover portion foldably connected to a main body and on a closed inner surface of which a display unit is mounted, wherein the cover portion comprises a first bezel portion formed to limit a region between an outline at a top side and left and right sides of the cover portion and an outline at a top side and left and right sides of the exposed area of the display unit, and a second bezel portion formed to limit a region between an outline at a bottom side of the cover portion and an outline at a bottom side of the exposed area of the display unit, and provided with a hinge portion for foldably connecting the cover portion to the main body, wherein the first bezel portion is configured to exclude elements excluding a fastening portion between a first case and a second case constituting the cover portion, and a camera or at least one wireless antenna fed to the computer main body is disposed in the second bezel portion.

In another aspect, the mobile device includes a method of implementing a bezel of a mobile device comprising a cover portion foldably connected to a main body and on a closed inner surface of which a display unit is mounted, the method comprising forming a first bezel portion to limit a region between an outline at a top side and left and right sides of the cover portion and an outline at a top side and left and right sides of the exposed area of the display unit, wherein elements excluding a fastening portion between a first case and a second case constituting the cover portion are excluded in the first bezel portion, forming a second bezel portion to limit a region between an outline at a bottom side of the cover portion and an outline at a bottom side of the exposed area of the display unit, wherein a hinge portion for foldably connecting the cover portion to the main body in the bezel portion is disposed, and disposing a camera or at least one wireless antenna fed to the computer main body in the second bezel portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the embodiments of the present invention, examples of which are illustrated in the accompanying drawings.

Hereinafter, a mobile device associated with the present invention will be described in more detail with reference to the accompanying drawings. A suffix "module" or "unit" used for constituent elements disclosed in the following description is merely intended for easy description of the specification, and the suffix itself does not give any special meaning or function.

Figure 1:
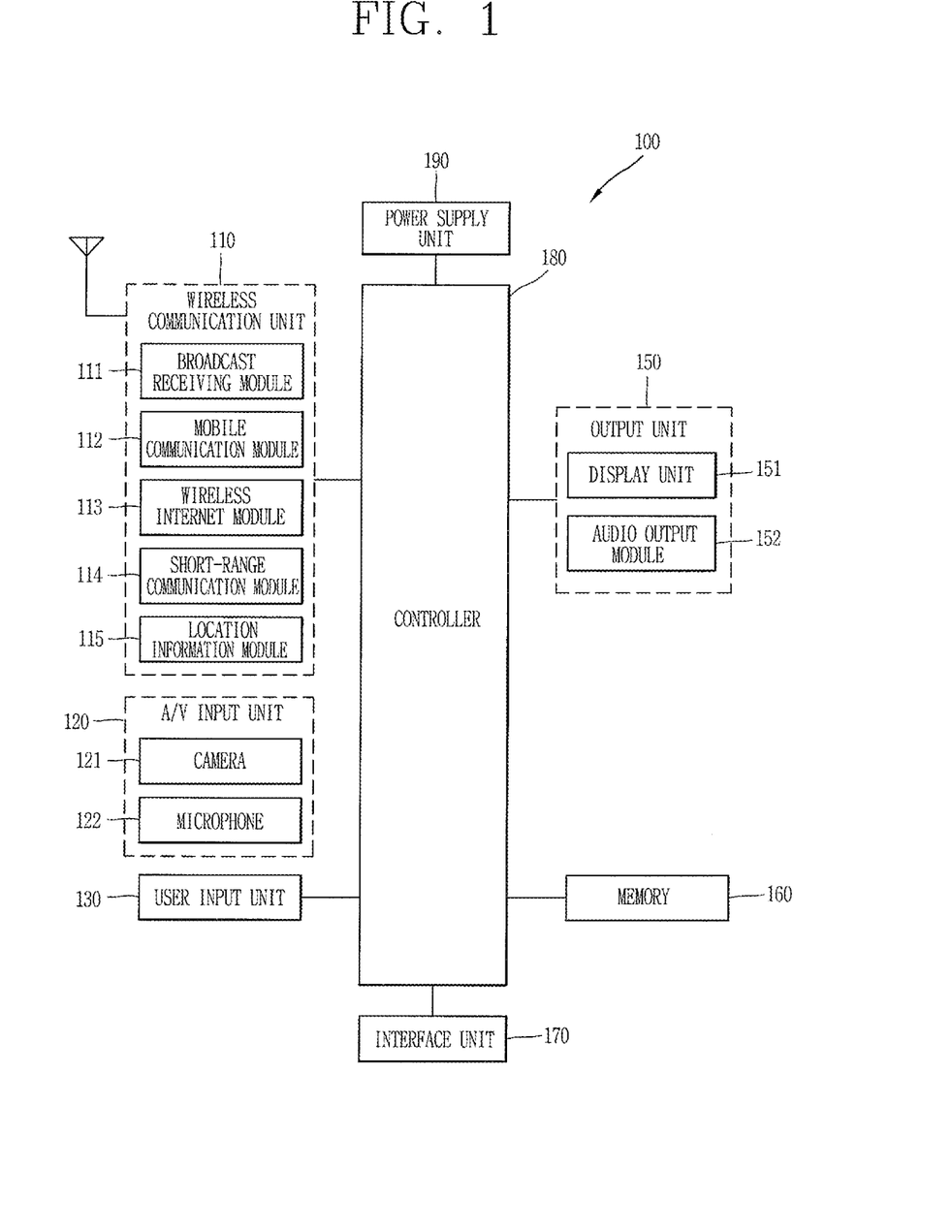
FIG. 1 is a block diagram illustrating an exemplary mobile device according to the present invention.

FIG. 1 is a block diagram illustrating an exemplary mobile device according to the present invention.

The mobile device 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. FIG. 1 illustrates a mobile device having various constituent elements. However, all the constituent elements as illustrated in the drawing are not necessarily required. The mobile device may be implemented with greater or fewer number of elements than those illustrated elements.

The wireless communication unit 110 typically includes one or more elements allowing radio communication between the mobile device 100 and another wireless communication system, or allowing radio communication between radio communication the mobile device 100 and a network in which the mobile device 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile device 100. The broadcast signal may include a TV broadcast signal, a radio broadcast signal and a data broadcast signal as well as a broadcast signal in a form that a data broadcast signal is coupled to the TV or radio broadcast signal.

On the other hand, the broadcast associated information may be provided through a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile device 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a GPS module as a representative example.

The A/V (audio/video) input unit 120 receives an audio or video signal, and the A/V (audio/video) input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like. In particular, in case where a touch pad and a display unit 151 which will be described later form an interlayer structure, it may be referred to as a touch screen.

The output unit 150 is configured to provide an output for visual sense, audible sense, or tactile sense, and the output unit 150 may include the display unit 151, an audio output module 152, an alarm unit 153, a haptic module 154, and the like.

The display unit 151 may display (output) information processed in the mobile device 100. For example, when the mobile device 100 may display a User Interface (UI) or a Graphic User Interface (GUI) associated with various modes.

When the display unit 151 and a touch sensitive sensor (hereinafter, referred to as a "touch sensor") have an interlayer structure, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller 180. The touch controller processes the received signals, and then transmits corresponding data to the controller 180. Accordingly, the controller 180 may sense which region of the display unit 151 has been touched.

A proximity sensor may be arranged at an inner region of the mobile device 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160. The audio output module 152 may output audio signals relating to functions performed in the mobile device 100. The audio output module 152 may include a receiver, a speaker, a buzzer, and so on.

The memory 160 may store a program for the processing and control of the controller 180, and temporarily store input/output data. The memory 160 may include at least one type of storage medium including a flash memory type, a hard disk type, a multimedia card micro type, a memory card type (e.g., SD or DX memory), random access memory (RAM), static random access memory (SRAM), read-only memory (ROM), electrically erasable programmable read-only memory (EEPROM), programmable read-only memory (PROM), magnetic memory, magnetic disk, optical disk, and the like.

The interface unit 170 may perform a role of interfacing to all external devices connected to the mobile device 100. The interface unit 170 may allow a data reception from an external device, a power delivery to each component in the mobile device 100, or a data transmission from the mobile device 100 to an external device. The interface unit 170 may include, for example, wired/wireless headset ports, external charger ports, wired/wireless data ports, memory card ports, audio Input/Output (I/O) ports, video I/O ports, and the like.

The controller 180 typically controls the overall operations of the mobile device 100. For example, the controller 180 performs the control and processing associated with system booting, user interface control, file management, execution, signal processing of multimedia, and the like.

The power supply unit 190 receives external and internal power and provides power required by various components under the control of the controller 180.

Figure 2:
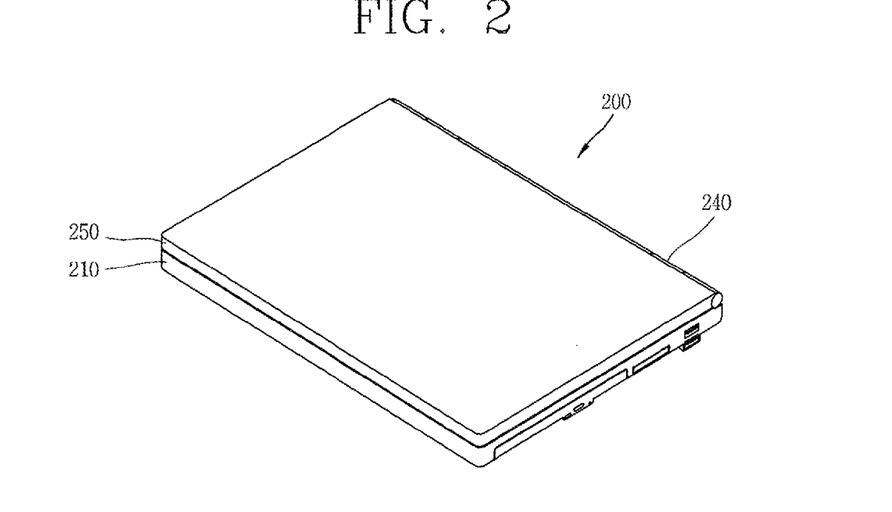
FIG. 2 is a perspective view illustrating a closed configuration of an exemplary mobile device according to the present invention.
Figure 3:
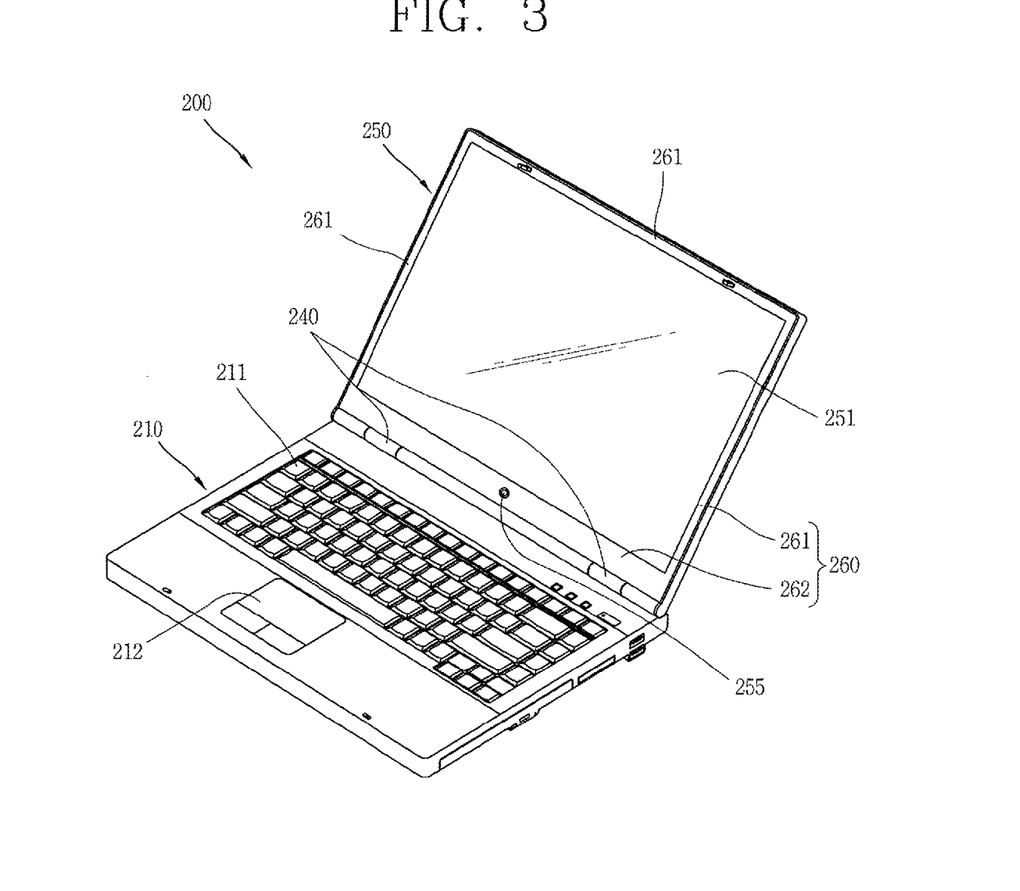
FIG. 3 is a perspective view illustrating an open configuration of the exemplary mobile device in FIG. 2.
Figure 14:
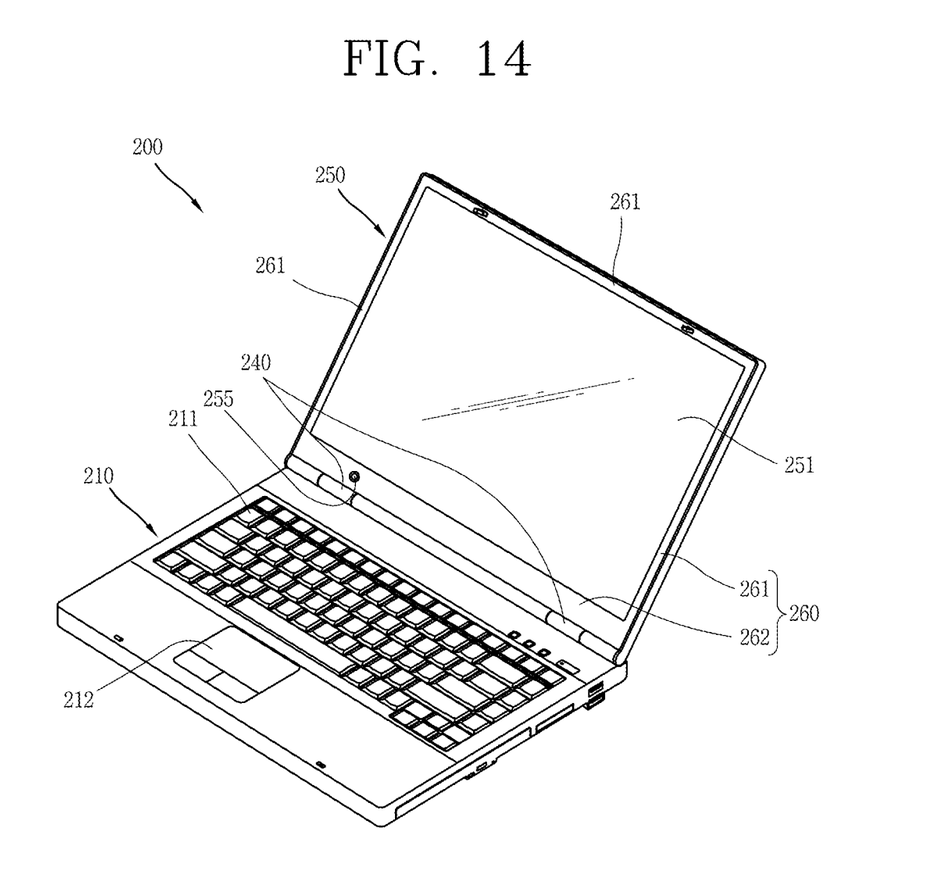
FIG. 14 is a perspective view illustrating an open configuration of the exemplary mobile device in FIG. 2.

FIG. 2 is a perspective view illustrating a closed configuration of an exemplary mobile device according to the present invention. FIG. 3 is a perspective view illustrating an open configuration of the exemplary mobile device in FIG. 2. FIG. 14 is a perspective view illustrating another open configuration of the exemplary mobile device in FIG. 2.

As illustrated in the drawings, a mobile device 200 may include a main body 210 having an input device and a cover portion 250 foldably connected to the main body 210. The input device may include a keypad 211 having a plurality of keys, thereby including a touch pad 212 allowing an input by a touch of a user. Moreover, the input device may include at least one button at any position of the main body 210 or cover portion 250, which is separated from the keypad 211, thereby allowing independent inputs (for example, power on/off, volume control, reset, etc.).

The main body 210 and the cover portion 250 includes a case (casing, housing, cover, etc.) forming an appearance of the mobile device. The case may include an inner case and an outer case. The cases may be formed by injection-molding a synthetic resin or may be formed of a metal material such as stainless steel (STS), titanium (Ti), or the like.

The cover portion 250 is connected to the main body 210 by a hinge portion 240 to implement any open angle with respect to the main body 210. Mechanically, the hinge portion 240 performs a role of supporting the cover portion 250 to be rotated with respect to the main body 210, and electrically, the hinge portion 240 is a path for passing wires therethrough to connect various elements included in the cover portion 250 to the main body 210.

A display unit 251 is disposed at a closed inner surface of the cover portion 250. The display unit 251 may be implemented by a liquid crystal display (LCD), a thin film transistor-LCD (TFT-LCD), an organic light emitting diode (OLED) display, a flexible display, a three-dimensional (3D) display, or the like. Some of these displays may be configured with a transparent type or optical transmissive type to allow viewing of the exterior through the display unit. The rear structure of the display unit 251 may be also configured with an optical transmissive type. Due to this structure, the user can view an object positioned at a rear side of the display unit 251 through a region occupied by the display unit 251. There may exist two or more display units 251 depending on the implementation of the mobile device 100. For example, in a mobile device, a plurality of the display units 251 may be arranged on one surface to be separated from or integrated with each other, or may be arranged on different surfaces, respectively.

A mobile device 200 according to the present invention commonly refers to a device having such a display unit 251, and mainly indicates an electronic device for the purpose of being hand-carried. Those examples may include a portable computer (notebook PC, tablet PC), a mobile terminal, an audio/video player, a gaming device, a navigation device, and the like.

A camera 255 for capturing an object is disposed at a lower side of the display unit 251. When attention is paid to a lower arrangement of the camera 255, it may be seen that a top end and left and right ends of the cover portion 250 are disposed to closely to the corresponding top end and left and right ends of the display unit 251. The technical description of this arrangement will be described in detail with reference to FIG. 4.

Figure 4:
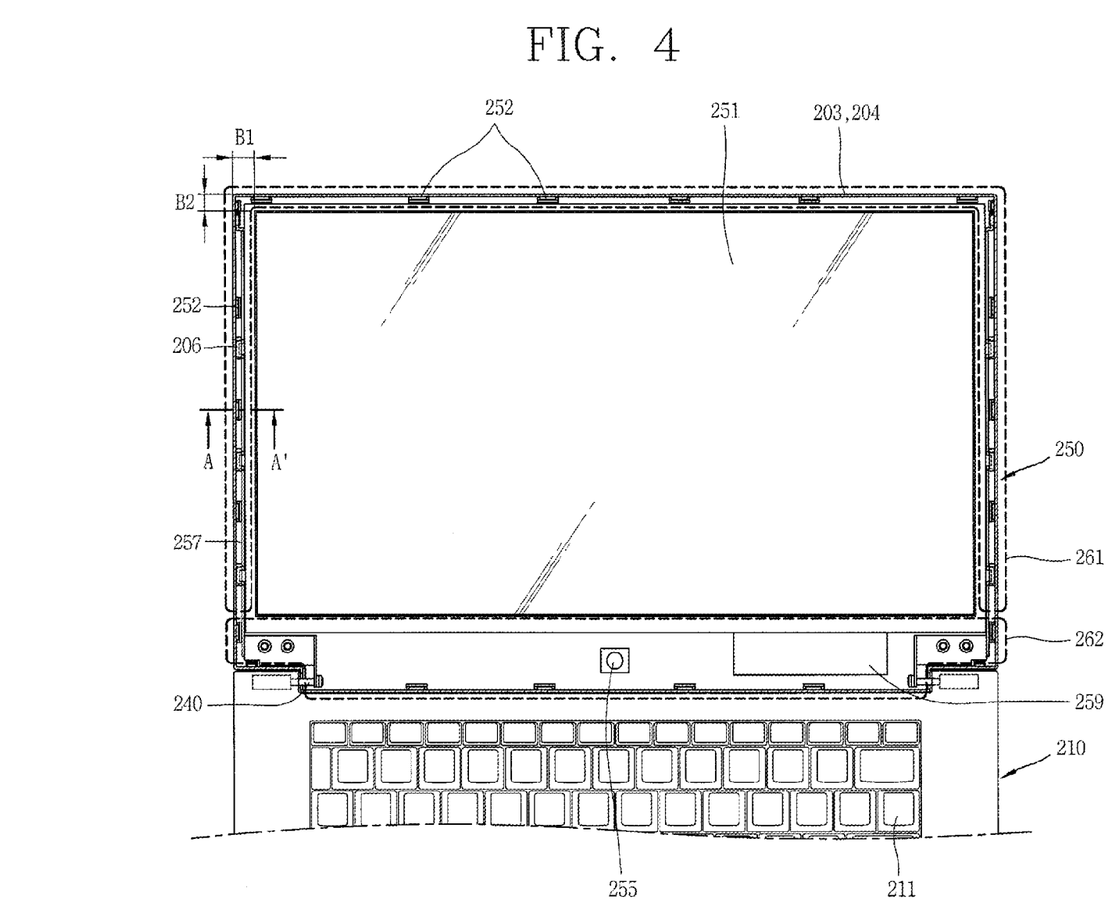
FIG. 4 is a projection view illustrating the configuration of elements in an exemplary cover portion according to the present invention.
Figure 5:
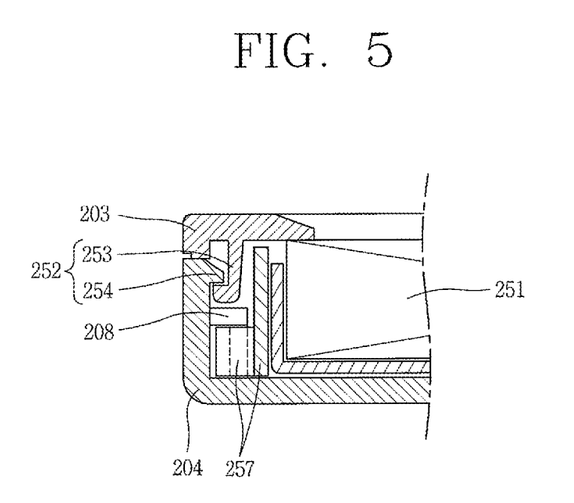
FIG. 5 is a cross-sectional view along the line A-A' in FIG. 4.

FIG. 4 is a projection view illustrating the configuration of elements in an exemplary cover portion according to the present invention. FIG. 5 is a cross-sectional view along the line A-A' in FIG. 4.

A display area of the display unit 251 may be limited by a bezel portion 260. In other words, the bezel portion 260 is made of a non-transparent type along an edge of the display unit, and thus the user can view the output content of the display unit 251 within the bezel portion. The bezel portion 260 may include a first bezel portion 261 formed along a top end and left and right ends of the display area of the display unit 251 and a second bezel portion 262 formed along a bottom end of the display area of the display unit 251.

The first bezel portion 261 and the second bezel portion 262 may be part of an inner case 203. In the present invention, there is proposed an arrangement structure in which the location of elements that can be mounted in the first bezel portion 261 and second bezel portion 262 is changed, thereby obtaining the first bezel portion 261 having a minimum width (B1, B2).

First, the first bezel portion 261 may include only a fastening portion of the display unit 251 to implement a narrow width. In other words, a camera 255 or antenna devices 255, 266, which will be describe later, may be excluded from the first bezel portion 261. Those elements, i.e., camera or antenna device, have a volume possessed by themselves, and act as a factor of increasing the width thereof at least as much as that, thereby limiting their arrangement. Here, the fastening portion of the display unit 251 is provided to fix the display unit 251 to cases 203, 204, thereby maintaining a state that the display unit 251 is securely fixed to the cover portion 250 as well as allowing the cover portion 250 to have rigidity greater than a predetermined value. As a result, it refers to a mechanical structure for preventing local stress from being concentrated on the display unit 251 by an unbalanced or varying force during a process of opening or closing the cover portion 250.

On the contrary, the second bezel portion 262 may include a hinge portion 240 for connecting the main body 210 to a bottom end thereof, which includes a camera 255. The camera 255 refers to a camera having an image sensor using a complementary metal oxide semiconductor (CMOS) or charge-coupled device (CCD) for converting light into electric charge to obtain an image, and it may be used to generate still or moving images or capture the user for video communication.

Accordingly, the first bezel portion 261 has a structure in which elements, excluding a fastening portion of the display unit 251, are removed and the camera 255 is located in the second bezel portion 262, thereby implementing a remarkably narrow width compared to a portable computer in the related art including a camera or antenna device. In addition, a camera or the like that makes the appearance more complicated may be excluded, and thus the first bezel portion 261 may be configured with a simple design. Moreover, in view of an example of the related art in which the wiring for connecting a camera or the like should be additionally consumed as well as a mounting space for the wiring should be consumed if disposed in the first bezel portion 261, such a camera is not disposed in the first bezel portion 261, thereby having an advantage that the cover portion 250 can be configured to be slimmer.

The wirings for connecting the display unit 251 and the camera 255 are collected in the second bezel portion 262 to be connected to the main body 210 through the hinge portion 240. A driving circuit board on which elements for driving the display unit 251 are mounted may be disposed in a region of the second bezel portion 262, thereby minimizing the thickness increase of the cover portion 250.

The fastening portions 252 for fastening an inner case to an outer case wherein the inner and outer cases cover the display unit 251 are disposed at a plurality of locations along the first bezel portion 261 and the second bezel portion 262. In particular, as illustrated in FIG. 4, the fastening portions 252 are disposed at a plurality of locations along a circumference of the first bezel portion 261. The fastening portion 252 is formed by the forming or molding process of an inner case or outer case, and thus it may be distinguished from an example of the related art in that a separate metal element, for example, a fastening member like a screw or the like is not used. The screw requires a plane region in itself, and thus its use inevitably increases the width of the bezel portion. As a result, in this present invention, the use of screws may be preferably excluded.

A metal frame 257 is provided in the left and right sides of bezel portions constituting the first bezel portion 261 to supplement the rigidity of the cover portion 250. The metal frame 257 may be disposed at a region between an outline at the left side of the cover portion 250 and an outline at the left side of the exposed area of the display unit 251 and between an outline at the right side of the cover portion 250 and an outline at the right side of the exposed area of the display unit 251. The metal frame 257 may be formed of a thin and light material such as stainless steel, aluminum, or the like, and may be formed in a narrowly and elongatedly extended shape along a lateral surface direction of the cover portion 250. The metal frame 257 may be formed in the shape of being fixed to either one of the inner case 203 or the outer case 204. For the fixation, a notch protrusion 208 to which the metal frame 257 is fixed may be included in the inner case 203 or the outer case 204.

There may be provided a pair of the left and right hinge portions 240 disposed in the second bezel portion 262 to increase the structural rigidity. The hinge portion 240 may be formed to have a suitable resistance so that the cover portion 250 can maintain a raised position at any angle with respect to the main body 210. The camera 255 may be disposed between both the hinge portions 240 or may be disposed at a side of any one hinge portion 240.

As illustrated in FIG. 5, the fastening portions 252 according to this example may be implemented by hooks 253 disposed at a plurality of locations and notch-shaped portions 254 at which the hooks 253 are formed to be caught. As a so-called snap shot structure, the hook 253 and the notch-shaped portion 254 are combined with each other by exerting a pressure in a vertical direction after the inner case 203 and the outer case 204 are engaged with each other.

Figure 7:
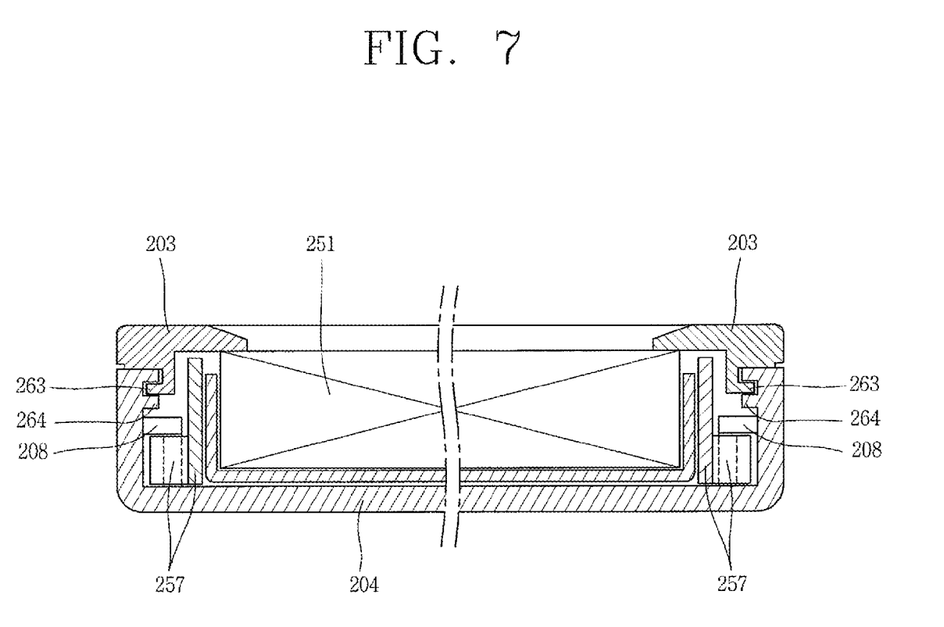
FIG. 7 is a cross-sectional view illustrating an exemplary fastening portion of the exemplary cover portion according to the present invention.

FIG. 7 is a cross-sectional view illustrating an exemplary fastening portion of the exemplary cover portion according to the present invention.

Contrary to the example of FIG. 5, the inner case 203 and the outer case 204 constituting a cover portion may be combined with each other by sliding. In other words, a first notch rail 263 is formed in the inner case 203, and a second notch rail 264 formed to be slid and caught at the first notch rail 263 is provided in the outer case 204. The first notch rail 263 and the second notch rail 264 constituting a fastening portion in this example are continuously brought into contact with each other, thereby effectively dispersing a force applied to the cover portion 250.

Contrary to FIGS. 5 and 7, a fastening portion for combining the inner case 203 and the outer case 204 constituting the cover portion 250 with each other may be combined by welding or bonding. Welding or bonding does not require a mechanical structure, thereby more reducing the width of the first bezel portion 261.

Figure 6:
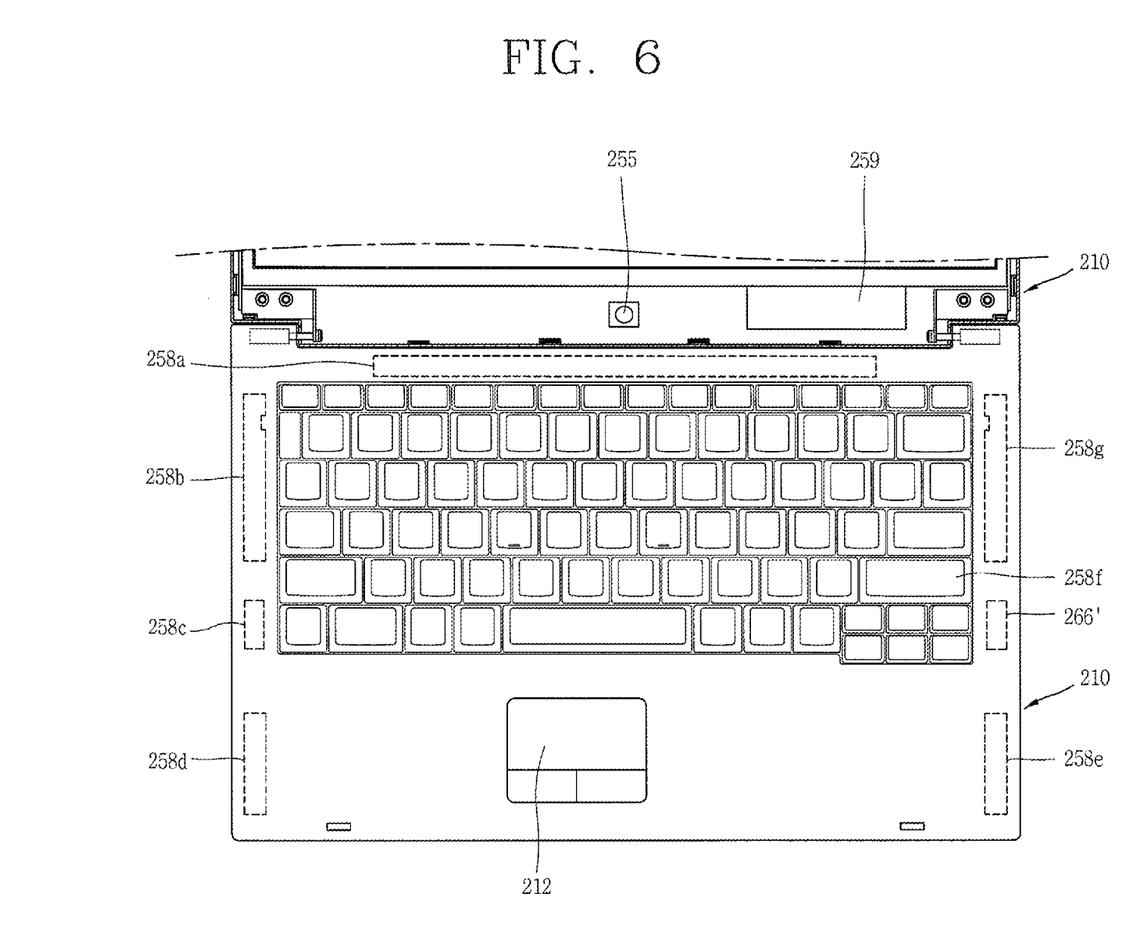
FIG. 6 is a projection plan view illustrating a configuration in which an exemplary wireless antenna device is disposed in an exemplary main body according to the present invention.

FIG. 6 is a projection plan view illustrating a configuration in which an exemplary wireless antenna device is disposed in an exemplary main body according to the present invention.

FIG. 6 is a projection plan view illustrating a configuration in which an exemplary wireless antenna device is disposed in an exemplary main body according to the present invention.

A wireless antenna not disposed in the cover portion 250 may be disposed in the main body 210. In this case, the wireless antenna may be selected at a position where the effect received by internal elements or metal composition is least. For example, the wireless antenna may be disposed at a top end thereof, both left and right ends thereof, a palm rest thereof, or the like. FIG. 6 illustrates the locations 258a through 258g at which such a wireless antenna can be mounted.

The wireless antenna may implement various wireless services provided by the mobile device 200 associated with the present invention. For example, a 2G, 3G, or 4G next-generation mobile communication antenna, a WiFi antenna, a Bluetooth antenna, or the like may be disposed, and furthermore, a broadcast receiving antenna, a GPS antenna, or the like may be included therein.

The wireless antenna may be disposed in the first bezel portion 261 of the cover portion 250 as a location that can minimize the effect received from metal composition or other elements in case of the related art. However, in this example, the arrangement is limited to implement the bezel having a narrow width, and thus it may be disposed in the main body 210, or may be disposed in the second bezel portion 262 as illustrated in an example which will be described later.

Figure 8:
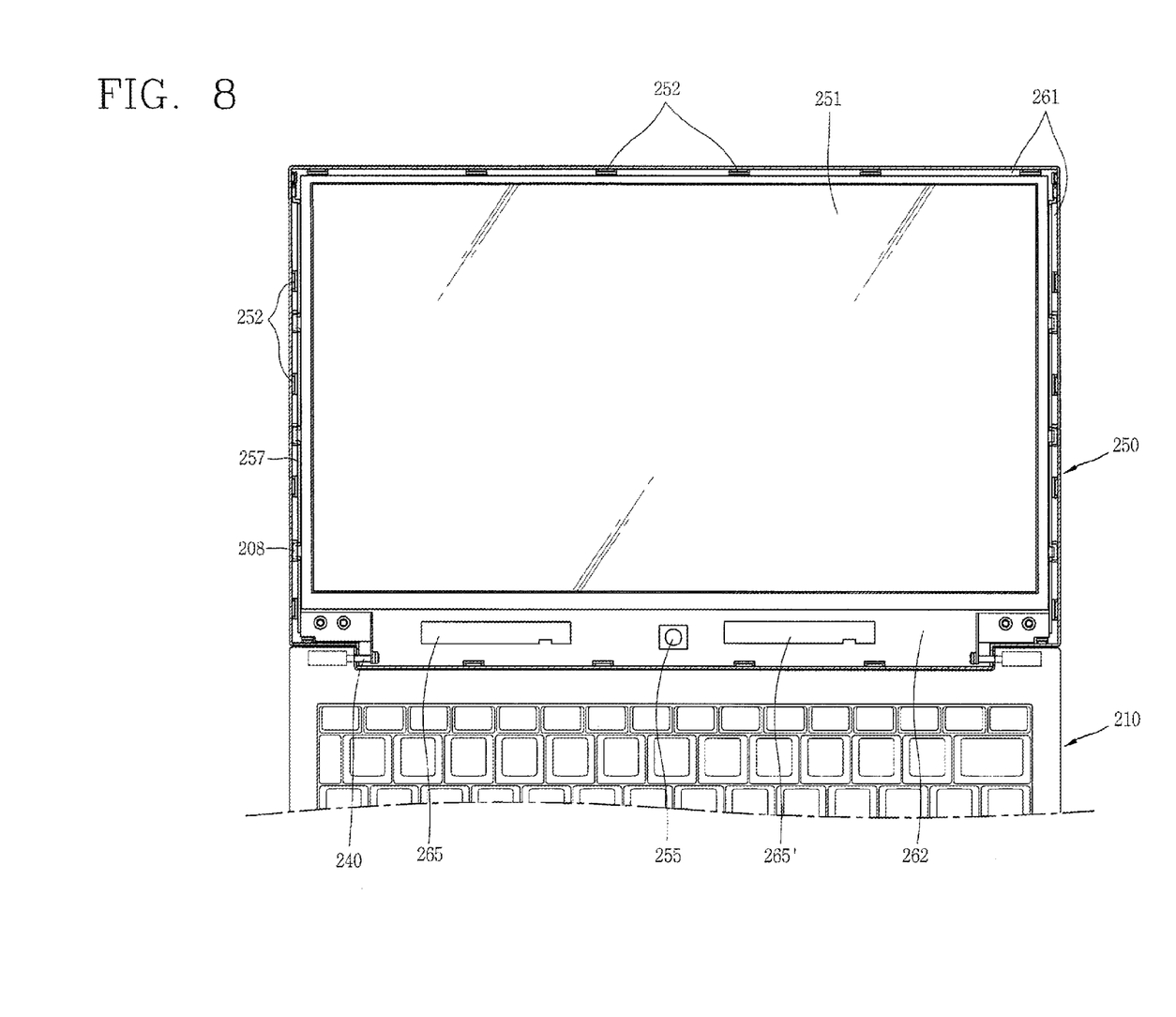
FIG. 8 is a projection plan view illustrating a configuration in which an exemplary mobile communication antenna is disposed in a second bezel portion according to an exemplary second embodiment of the present invention.
Figure 9:
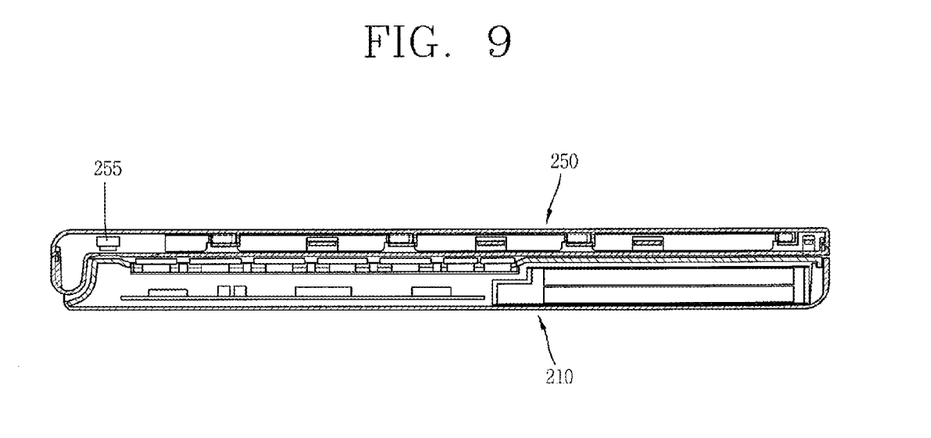
FIG. 9 is a cross-sectional view illustrating a configuration in which a mobile device of FIG. 8 is closed according to an exemplary second embodiment of the present invention.
Figure 10:
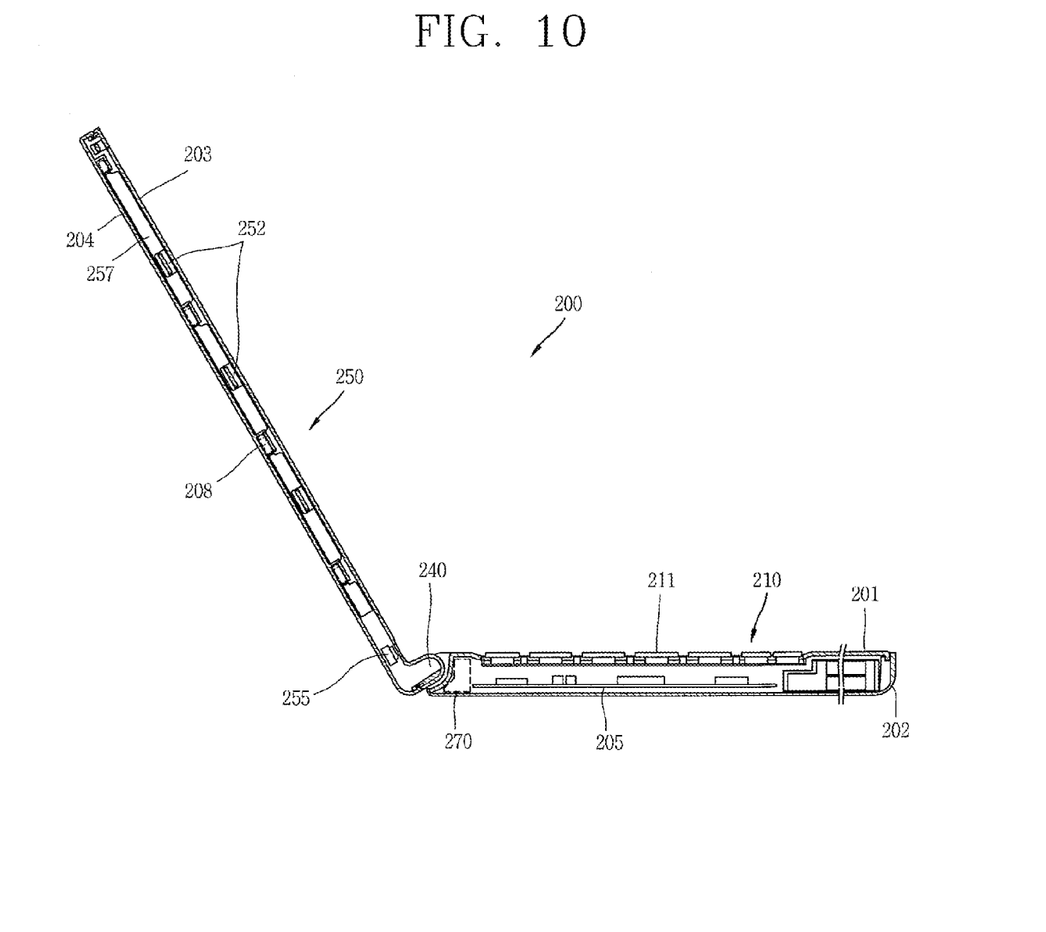
FIG. 10 is a cross-sectional view illustrating a configuration in which a mobile device of FIG. 8 is opened according to an exemplary second embodiment of the present invention.

FIGS. 8 through 10 illustrate a second embodiment according to the present invention. FIG. 8 is a projection plan view illustrating a configuration in which an exemplary mobile communication antenna is disposed in a second bezel portion according to an exemplary second embodiment of the present invention. FIG. 9 is a cross-sectional view illustrating a configuration in which a mobile device of FIG. 8 is closed according to an exemplary second embodiment of the present invention. FIG. 10 is a cross-sectional view illustrating a configuration in which a mobile device of FIG. 8 is opened according to an exemplary second embodiment of the present invention.

Contrary to the foregoing first embodiment, mobile communication antennas 265, 265' of the 2G/3G/4G or next-generation communication among wireless antennas may be disposed in the second bezel portion 262 of the cover portion 250. Preferably, the antennas 265, 265' may be located to be apart a predetermined distance from a metallic bottom end of the display unit 251, and also located to be apart a predetermined distance from the metallic hinge portion 240.

The antennas 265, 265' may be formed at either one side of the second bezel portion 262, or two or more antennas 265, 265' may be provided to implement diversity. According to FIG. 8, a pair of the antennas 265, 265' may be disposed in the state of being separated from each other, and the camera 255 may be disposed between the antennas 265, 265'.

A circuit board for driving the display unit 251 may be configured in the form of being stacked at a rear surface of the display unit 251 in the state of being folded in the second bezel portion 262. In this case, the circuit board for driving the display unit may be formed in the shape of a flexible circuit board.

According to FIGS. 9 and 10, a metal-removed area 270 is formed in an area adjacent to the second bezel portion 262 of the main body 210, in other words, in a predetermined distance from a top end of the main body 210, not to deteriorate the wireless characteristic of the antennas 265, 265' mounted in the second bezel portion 262. In the metal-removed area 270, the mounting of a metal connector (for example, USB connector, VGA slot, external I/O, etc.) and conductive metal elements is limited, and furthermore, the forming of a conductive ground formed on a main circuit board 205 may be limited. Also, a battery pack may not be disposed in the metal-removed area 270.

Figure 11:
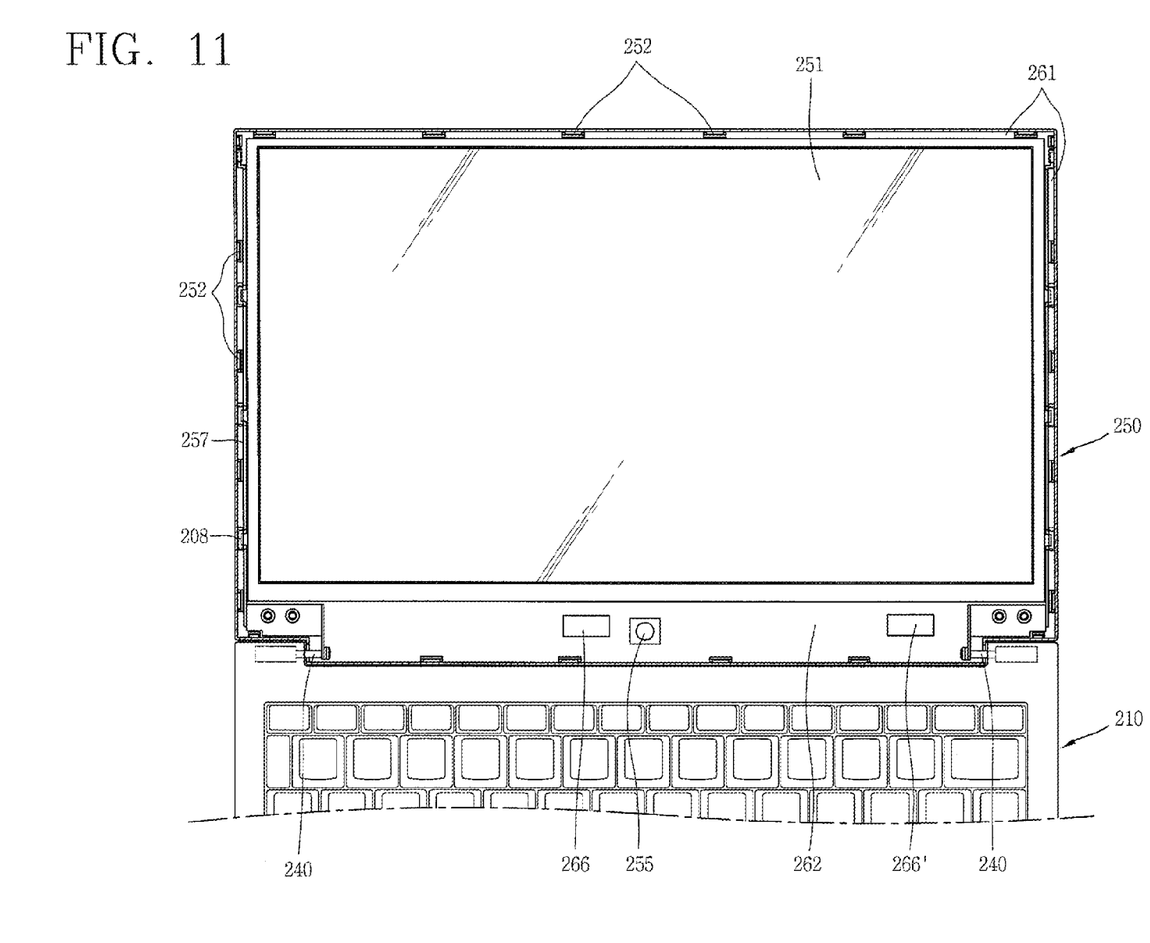
FIG. 11 is a projection plan view illustrating a configuration in which a WiFi antenna is disposed in the second bezel portion according to an exemplary third embodiment of the present invention.

FIG. 11 is a projection plan view illustrating a configuration in which a WiFi antenna is disposed in the second bezel portion according to an exemplary third embodiment of the present invention.

In other words, contrary to FIG. 10, mobile communication antennas 265, 265' among the wireless antennas may be disposed in the main body 210 while WiFi antennas 266, 266' may be disposed in the second bezel portion 262 of the cover portion 250.

In this case, the antennas 266, 266' may be located to be apart from a predetermined distance from a metallic bottom end of the display unit 251, and also located to be apart from a predetermined distance from the metallic hinge portion 240. In case where a sufficient plane region is formed in the second bezel portion 262 by disposing WiFi antennas 266, 266' occupying a relatively small volume, a circuit board for driving the display unit 251 may be disposed in the plane region. In consideration of the wireless characteristic of the antennas 266, 266', a metal-removed area 270 may be formed in a region adjacent to the second bezel portion 262 of the main body 210, in other words, in a predetermined distance from a top end of the main body 210.

Figure 12:
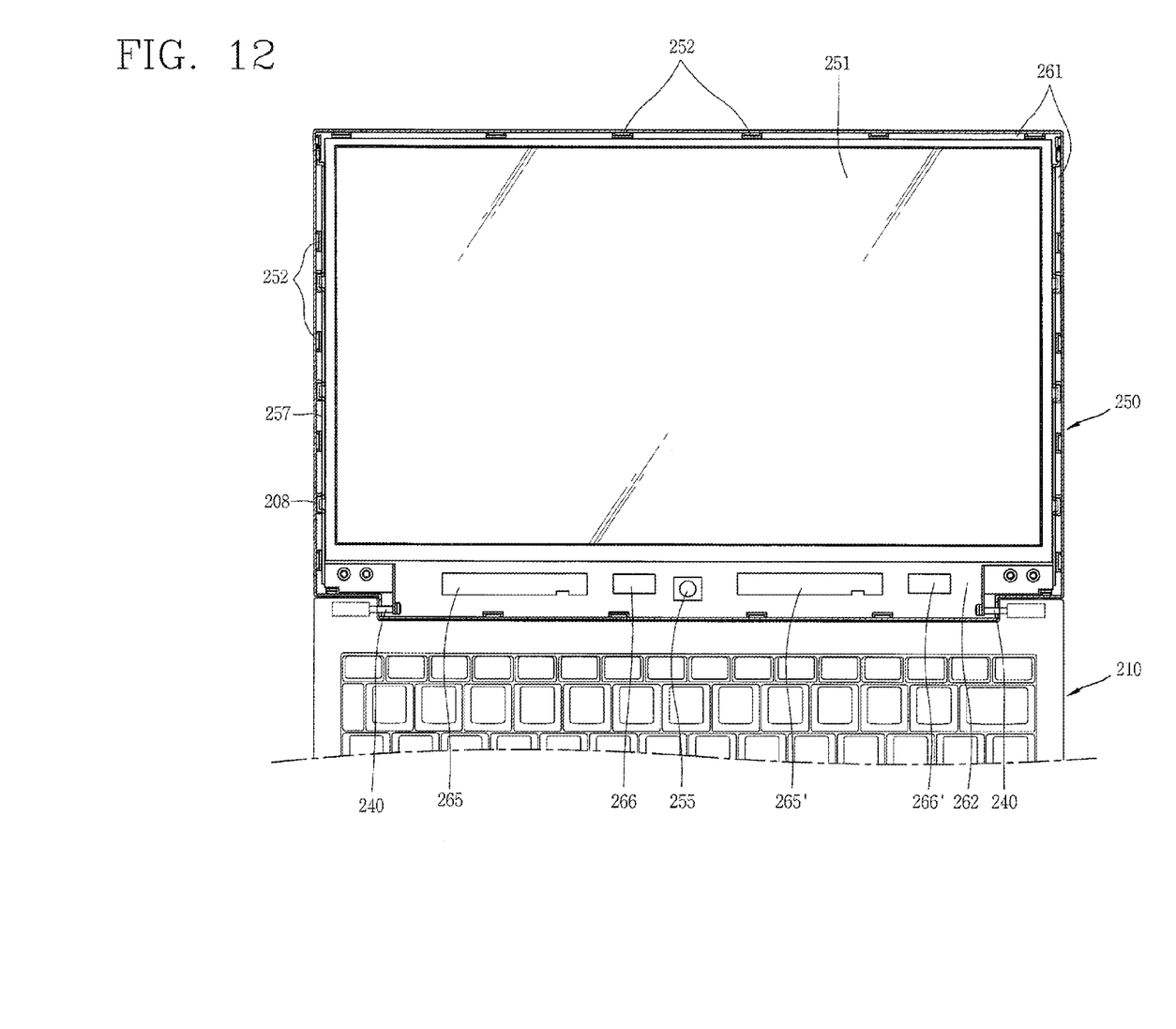
FIG. 12 is a projection plan view illustrating a configuration in which a mobile communication antenna and a WiFi antenna are disposed in the second bezel portion according to an exemplary fourth embodiment of the present invention.

FIG. 12 is a projection plan view illustrating a configuration in which a mobile communication antenna and a WiFi antenna are disposed in the second bezel portion according to an exemplary fourth embodiment of the present invention In other words, contrary to FIGS. 10 and 11, both mobile communication antennas 265, 265' and WiFi antennas 266, 266' among the wireless antennas may be disposed in the second bezel portion 262 of the cover portion 250. The camera 255 may be disposed in the second bezel portion 262 or provided in the main body 210. The antennas 265, 265', 266, 266' may be located to be apart from a predetermined distance from a metallic bottom end of the display unit 251, and also located to be apart from a predetermined distance from the metallic hinge portion 240. In consideration of the wireless characteristic of the antennas 265, 265', 266, 266', a metal-removed area 270 may be formed in a region adjacent to the second bezel portion 262 of the main body 210, in other words, in a predetermined distance from a top end of the main body 210.

Figure 13:
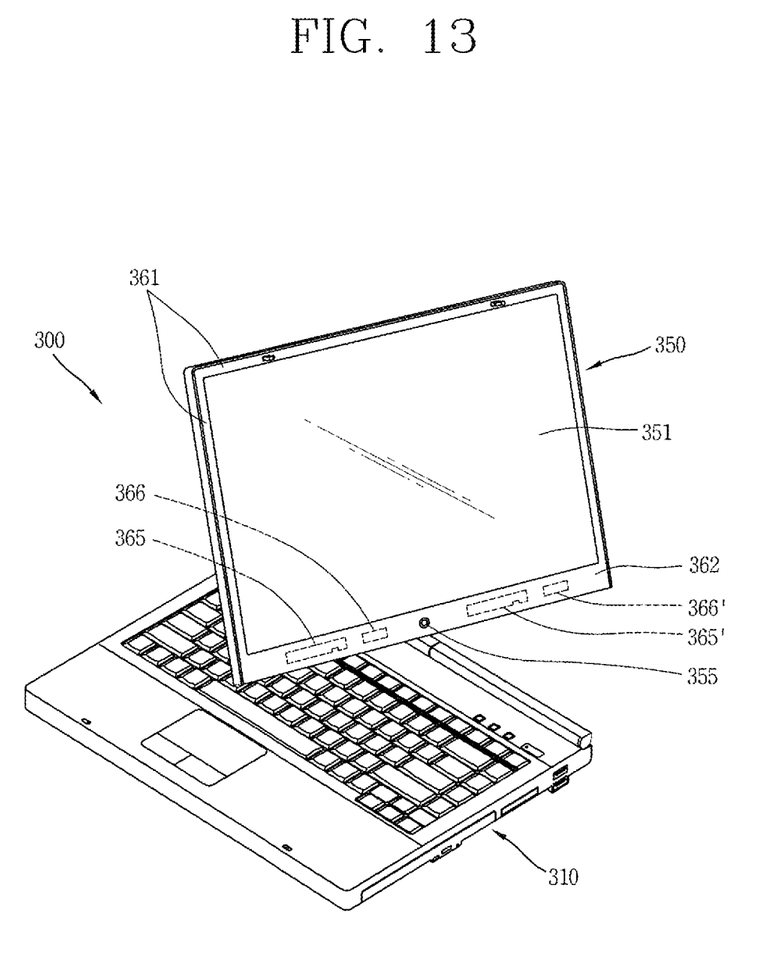
FIG. 13 is a perspective view illustrating a configuration in which a narrow bezel is implemented in a mobile device having a swivel hinge portion according to yet another exemplary embodiment of the present invention.

FIG. 13 is a perspective view illustrating a configuration in which a narrow bezel is implemented in a mobile device having a swivel hinge portion according to yet another exemplary embodiment of the present invention.

As illustrated in FIG. 13, the present invention may be applicable to a mobile device 300 having a cover portion 350 rotatably connected around two or more axes with respect to the main body 310. The hinge portion 340 may be referred to as a so-called swivel hinge. Various positional relations to the user and the mobile device 300 may be implemented by rotating the cover portion 350 around the first axis with respect to the main body 310 to be open or closed, or rotating the cover portion 350 at various angles around the second axis in a open configuration.

A narrow bezel may be also applicable to the mobile device 300. In other words, the mounting of elements excluding an element for fastening the display unit 351 may be excluded in the first bezel portion 361, and at least one of a camera or wireless antenna may be disposed in the second bezel portion 362.

As described above, according to a mobile device associated with the present invention, a fastening portion of the display unit may be only disposed in the first bezel portion that can limit the circumferential appearance of the display unit, thereby drastically reducing a width of the first bezel portion. Also, at least one of a camera or wireless antenna may be disposed in a space, such as the second bezel portion that can be provided only for a hinge portion, thereby obtaining highly useful arrangement while not reducing or weakening the function of wireless services or multimedia.

The configurations and methods according to the above-described embodiments will not be applicable in a limited way to the foregoing mobile device, and all or part of each embodiment may be selectively combined and configured to make various modifications thereto.

It will be apparent to those skilled in the art that various modifications and variations can be made in the mobile device of the present invention without departing from the spirit or scope of the invention. Thus, it is intended that the present invention cover the modifications and variations of this invention provided they come within the scope of the appended claims and their equivalents.

What is claimed is:

1. A mobile device, comprising: a main body provided with an input device; a cover portion including a display unit, the cover portion including:
a first bezel portion; and a second bezel portion;
a hinge portion for rotatably coupling the cover portion to the main body with an axis; and a camera for capturing an image of object, and wherein the first bezel portion is formed along three adjacent sides of the display unit, wherein the second bezel portion is disposed at a lower side of the display unit; the second bezel portion comprises: a first rectangular part adjacent to a lower side of the display unit and the first bezel portion, and a second rectangular part adjacent to the first rectangular part and a top edge of the main body, and the axis only passes through the second rectangular part; wherein the display unit and the camera are connected to the main body using wirings passing through the hinge portion, at least one wireless antenna for connecting to a wireless network that is located external to the mobile device, wherein the at least one wireless antenna is located between the display unit and the input device, and excluded from the first bezel portion and the main body, wherein a width of the first bezel portion is formed to be narrower than a width of the second bezel portion, wherein the camera is disposed in the first rectangular part such that the camera is excluded from the first bezel portion, and wherein the at least one wireless antenna is disposed in the second bezel portion.

2. The mobile device of claim 1, wherein:
the hinge portion includes a plurality of hinges separated from each other by a predetermined distance; and
the camera is disposed near one of the plurality of hinges.

3. The mobile device of claim 1, wherein a first wiring for connecting the camera and the main body to each other is configured to pass through the hinge portion.

4. The mobile device of claim 3, wherein a second wiring for connecting the display unit and the main body to each other is configured to pass through the hinge portion.

5. The mobile device of claim 4, wherein the first wiring and the second wiring are collected in the second bezel portion to be connected to the main body through the hinge portion.

6. The mobile device of claim 1, wherein a driving circuit board on which elements for driving the display unit are mounted is disposed in the second bezel portion.

7. The mobile device of claim 1, wherein the first bezel portion includes a fastening portion of the display unit.

* * * * *